Sept. 29, 1942.　　　　F. J. OFFEN　　　　2,297,014
MAGAZINE PHONOGRAPH
Filed May 7, 1941　　　　13 Sheets-Sheet 5

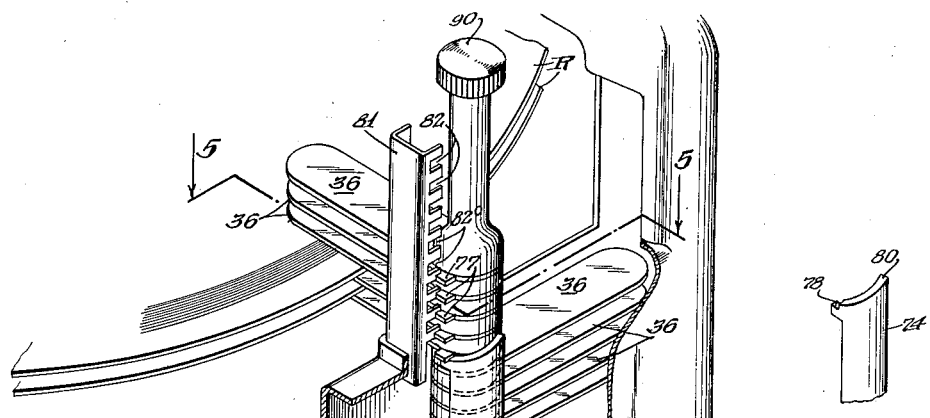
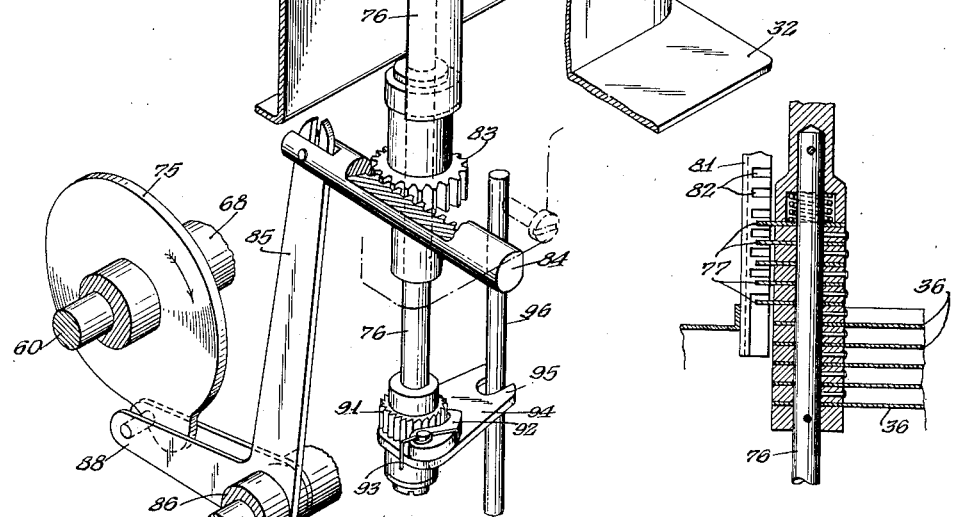
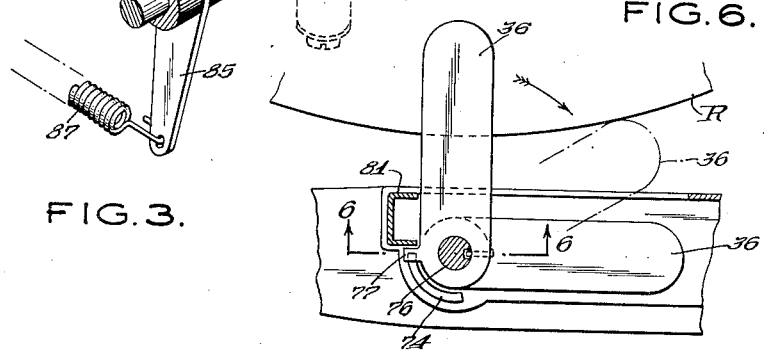

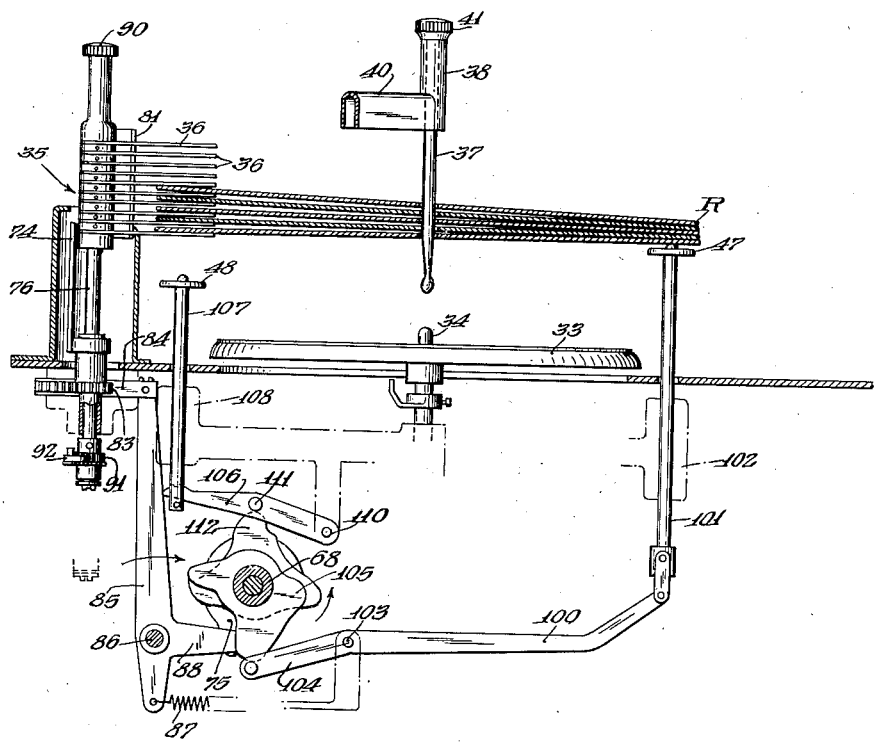

INVENTOR.
Frances John Offen
BY
ATTORNEY.

Sept. 29, 1942.    F. J. OFFEN    2,297,014
MAGAZINE PHONOGRAPH
Filed May 7, 1941    13 Sheets-Sheet 6

INVENTOR.
BY Francis John Offen
ATTORNEY.

Sept. 29, 1942.　　　F. J. OFFEN　　　2,297,014
MAGAZINE PHONOGRAPH
Filed May 7, 1941　　　13 Sheets-Sheet 7

INVENTOR.
BY
ATTORNEY.

Sept. 29, 1942.　　　F. J. OFFEN　　　2,297,014
MAGAZINE PHONOGRAPH
Filed May 7, 1941　　　13 Sheets-Sheet 8

INVENTOR.
BY
ATTORNEY.

Sept. 29, 1942.  F. J. OFFEN  2,297,014
MAGAZINE PHONOGRAPH
Filed May 7, 1941  13 Sheets-Sheet 9

INVENTOR.
Francis John Offen
BY
ATTORNEY.

Sept. 29, 1942.  F. J. OFFEN  2,297,014
MAGAZINE PHONOGRAPH
Filed May 7, 1941  13 Sheets-Sheet 10
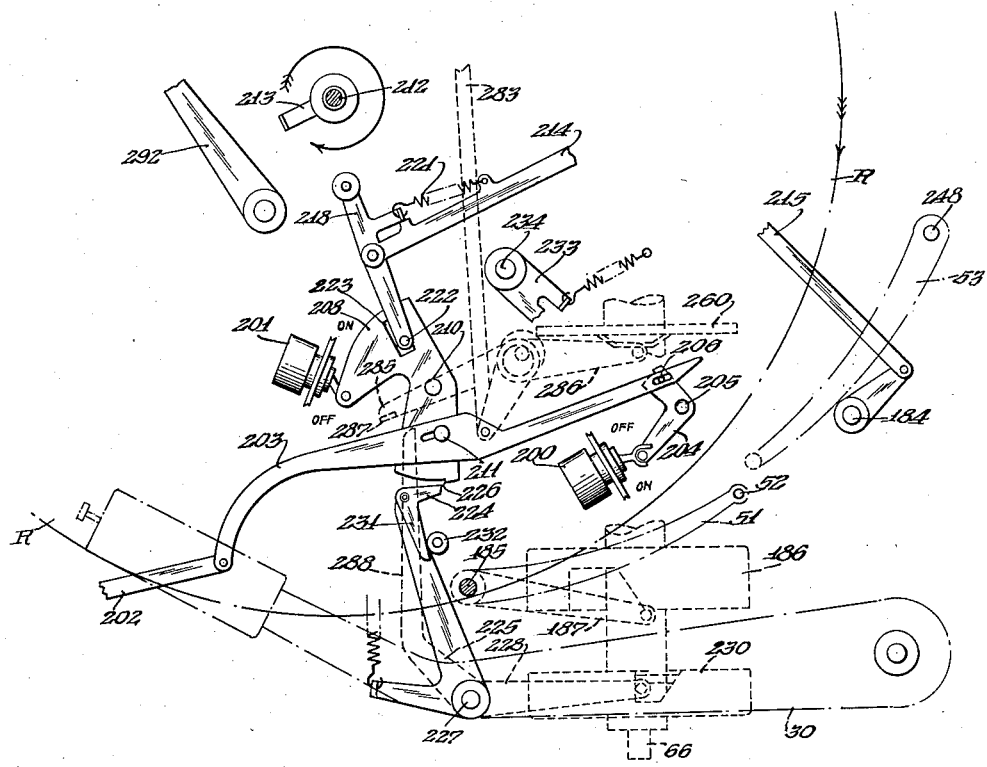
FIG. 19.
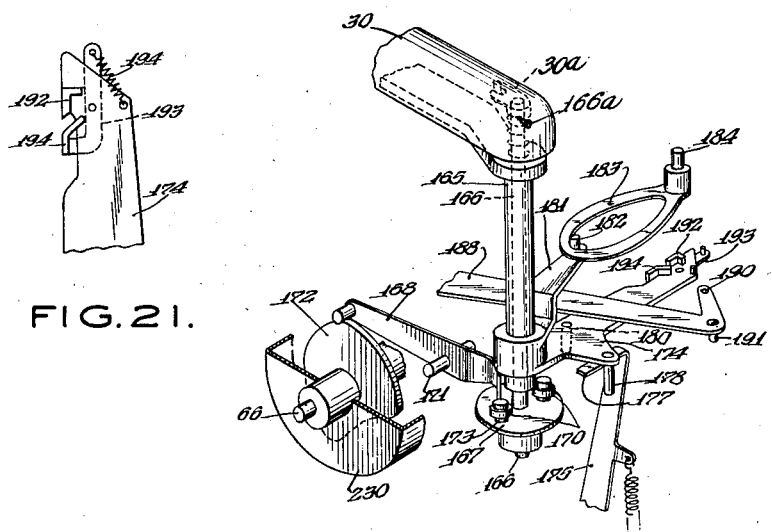
FIG. 21.
FIG. 20.
INVENTOR.
Francis John Offen
BY
ATTORNEY.

Sept. 29, 1942.　　　　F. J. OFFEN　　　　2,297,014
MAGAZINE PHONOGRAPH
Filed May 7, 1941　　　13 Sheets-Sheet 12

INVENTOR.
Francis John Offen
BY
ATTORNEY.

Sept. 29, 1942.　　　F. J. OFFEN　　　2,297,014
MAGAZINE PHONOGRAPH
Filed May 7, 1941　　　13 Sheets-Sheet 13
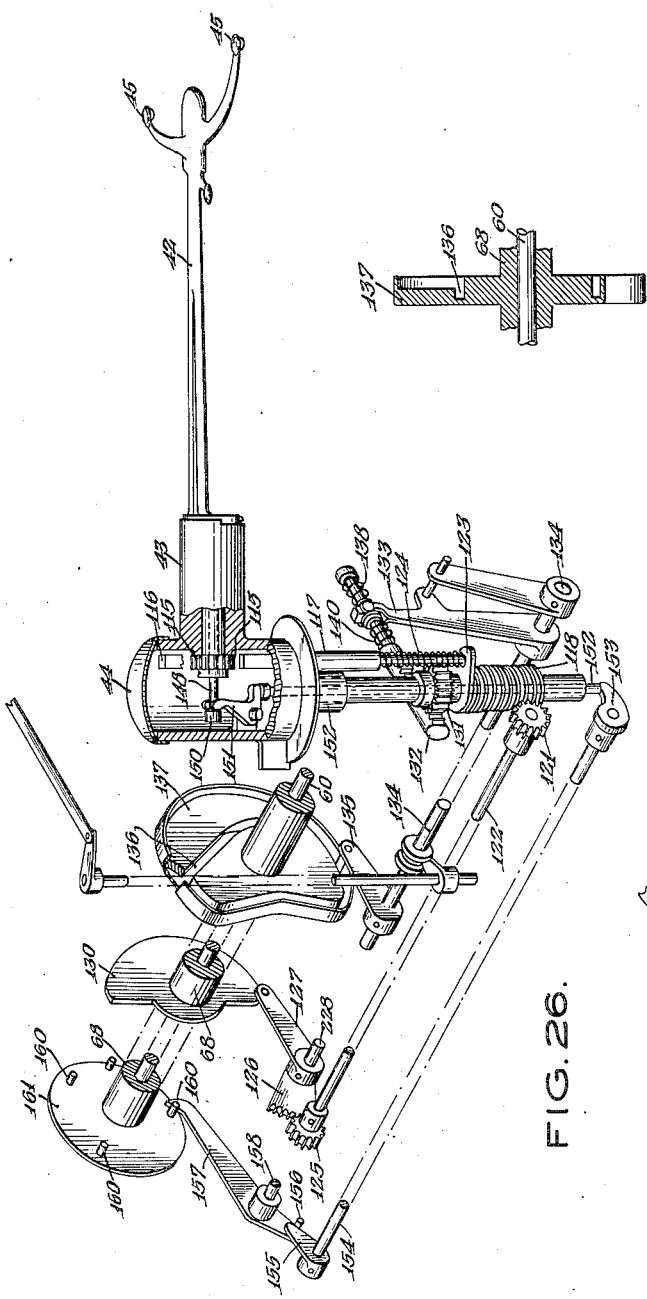
INVENTOR.
BY
ATTORNEY.

Patented Sept. 29, 1942

2,297,014

UNITED STATES PATENT OFFICE 2,297,014

MAGAZINE PHONOGRAPH

Francis John Offen, Swindon, England, assignor to The Garrard Engineering & Manufacturing Company, Limited, Swindon, England, a corporation of Great Britain Application May 7, 1941, Serial No. 392,200

19 Claims. (Cl. 274—10)

In accordance with the system of the invention a plurality of records are automatically played in a predetermined sequence. The records are manually assembled in a record magazine, where they are held in spaced relationship. The magazine includes a number of vanes which can be individually swung clear of the edge of the records, to successively drop the records onto the turntable.

In order to start the record changing cycle, a switch is manually closed which starts the motor which rotates the turntable. A second motor operates the record changing mechanism. A record is dropped from the record magazine onto the turntable, and the pick-up arm is properly positioned on the marginal edge of the record. To correctly position the pick-up arm on the edge of the record regardless of its diameter, the size of the record is determined by a selector mechanism that includes a feeler arm. The feeler arm is swung against the record on the turntable. The pick-up arm is then lowered onto the record, and the playing thereof starts.

When the record has been played, the pick-up arm is automatically swung clear of the record and held in an inoperative position. The record is then lifted a short distance from the turntable by two elevators. A record reversing arm swings below the lifted record and grips it with gripping elements. The record reversing arm is then swung above a storage receptacle, and is turned about its axis to reverse the record. The record reversing arm then returns to a position above the turntable, and drops the record onto the turntable. Playing of the reverse side of the record then starts in the manner described. When the playing is finished, the pick-up arm is again swung back to its inoperative position. The record is again lifted by the record reversing arm and deposited in the storage receptacle.

It is one of the objects of this invention to provide an improved mechanism for automatic delivery of disc records one at a time from a stack formation in a storage position onto a turntable in playing position, wherein each record is sequentially delivered from the underside of the stack of records.

Specifically, it is an object of this invention to provide a mechanism for automatically delivering records of mixed diameter from a stack formation in a storage position onto the turntable by a series of operatively associated supports and carriers actuable in sequence and operable on the lowermost record of the stack of records to deliver such record from the stack to the turntable.

These and other advantages, capabilities, and features of the invention will appear from the subjoined detailed description of one specific embodiment therefor, illustrated in the accompanying drawings, in which Figure 1 is a view in perspective of an embodiment of a phonograph in accordance with the invention, in a condition where the last record has been disposed of.

Figure 3 is a view in perspective, with some parts broken away, showing the record magazine and associated record shifting mechanism.

Figure 4 is a view in perspective of a detail of Figure 3.

Figure 5 is a cross-sectional view taken along line 5—5 of Figure 3.

Figure 6 is a longitudinal section taken along line 6—6 of Figure 5.

Figure 7 is a vertical section taken on line 7—7 of Figure 2 illustrating the record magazine in readiness to drop the lowermost record.

Figure 8 is a view similar to Figure 7 illustrating the record magazine in a position with the lowermost record dropped on two raised elevators.

Figure 19 is a top plan view similar to Figure 14, showing the position of the mechanism corresponding to when only one side of the record is to be played.

Figure 20 is a view in perspective, with some parts broken away, illustrating the pick-up arm and the cam for controlling its movements.

Figure 21 is a detail-view of a portion of the pick-up arm mechanism of Figure 20.

Figure 26 is a view in perspective of the record reversing arm, and the cams controlling its movements.

Figure 27 is a cross-sectional view of a detail, taken along the line 27—27 of Figure 26.

Figure 28 is an enlarged plan view as taken from the rear of the record reversing arm, illustrating its gripping members.

Figure 1:
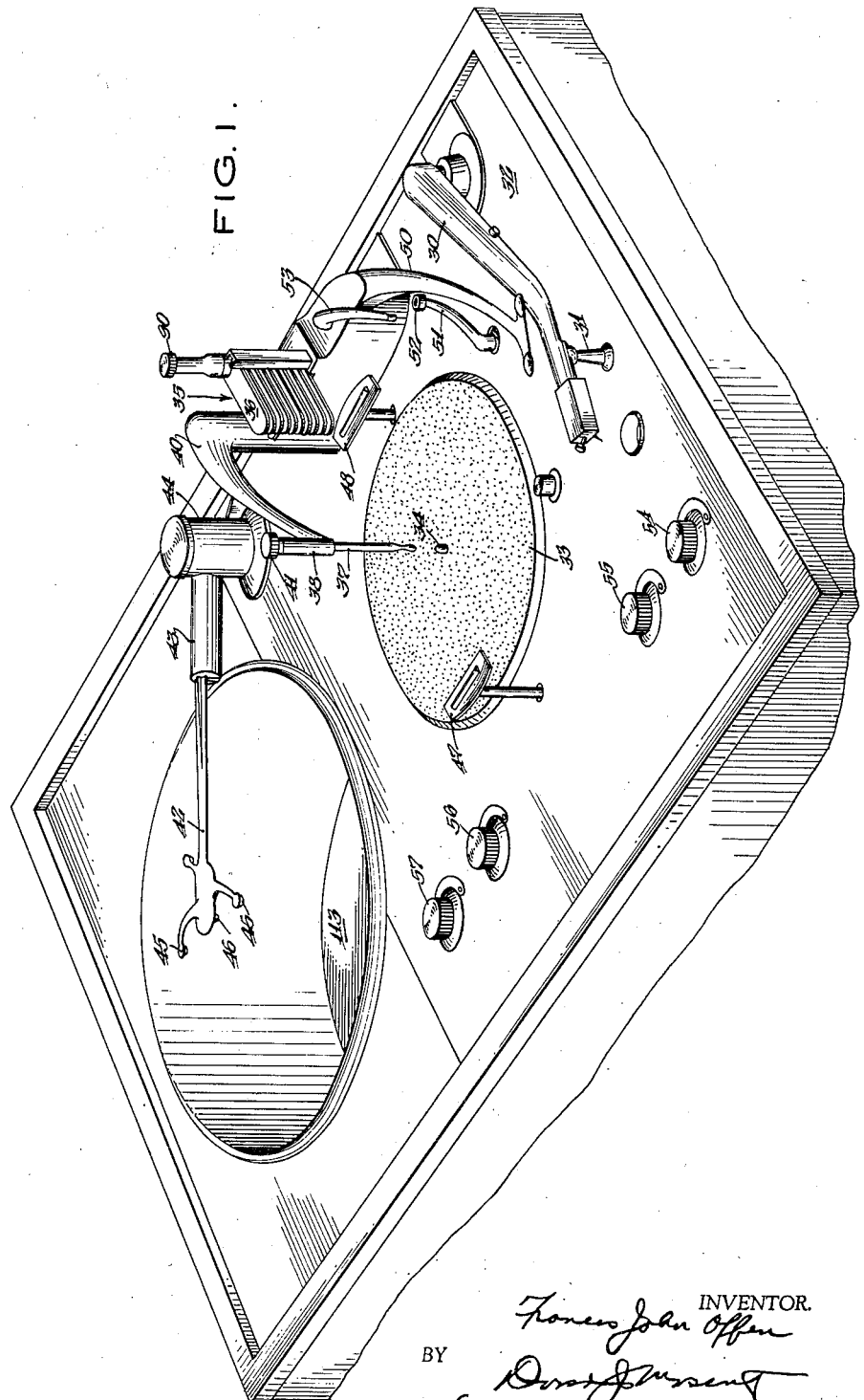
Figure 2:
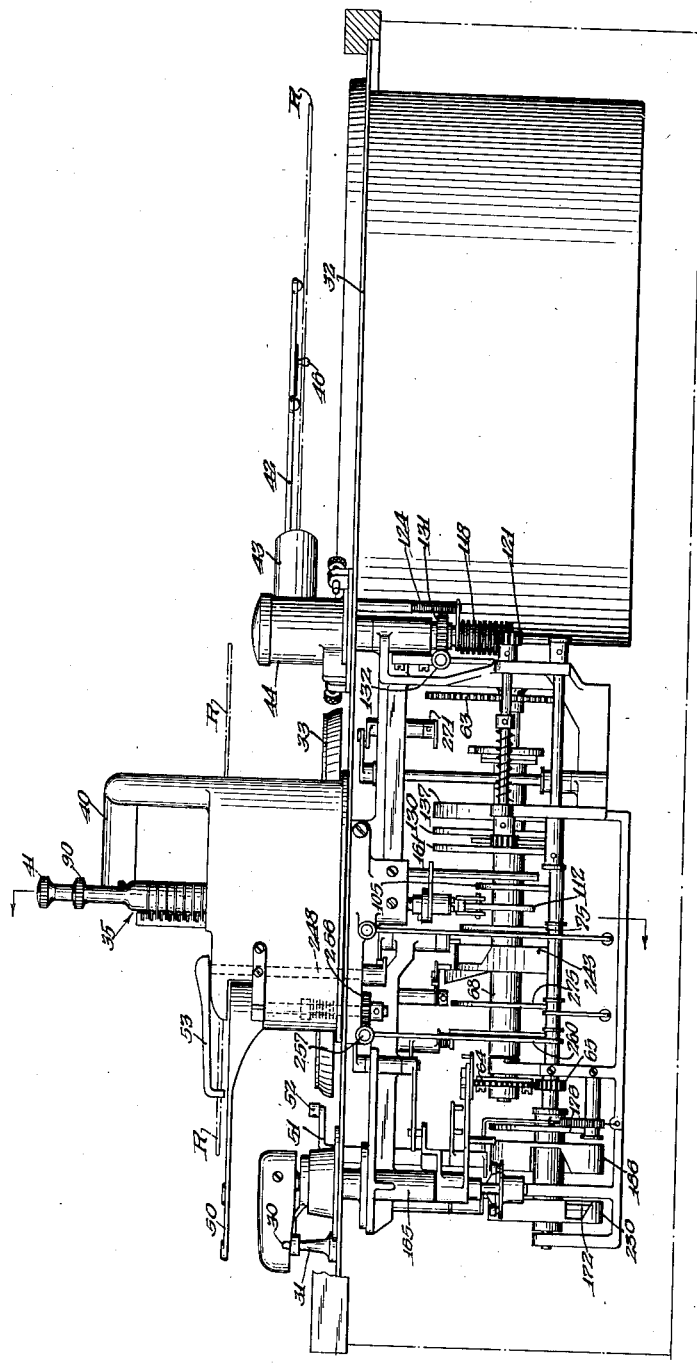
Figure 2 is a side elevational view of the phonograph mechanism, particularly showing a series of cams used to operate the tone arm, record magazine, and record reversing arm.

Referring to the drawings, and more particularly to Figures 1 and 2, the phonograph is seen to comprise a pick-up arm 30 which rests on post 31 when not in use. Pick-up arm 30 is arranged above motor-board 32. A spindle 34 extends therefrom for centering the records thereon. The records are stacked in magazine 35 having a plurality of spaced vanes 36. The records are held centrally above turntable 33 by centering spindle 37 mounted in sleeve 38 on arm 40. Arm 40 is mounted on motor-board 32. Centering spindle 37 has an actuating knob 41 and may be pulled out from sleeve 38.

Record reversing arm 42 is rotatably mounted in sleeve 43 projecting laterally from the upper end of vertical casing 44. Casing 44 is rotatably mounted in motor-board 32. Record reversing arm 42 has a lateral extension 45 to provide an extended supporting surface to prevent the tilting of an engaged record. The rear surface of reversing arm 42 is provided with gripping pins 46 for engaging the central aperture of a record. Two elevators 47 and 48 serve to lift and lower the record on turntable 33. A record supporting arm 50 is arranged above turntable 33 for supporting the stack of records arranged with vanes 36.

A feeler arm 51 is rotatably mounted so that its roller 52 may engage the edge of a record positioned on the turntable. Feeler arm 51 serves to detect the size of the record on turntable 33. As will be explained in detail hereinafter, a shut-down arm 53 is mounted so that its free end may engage with the edge of the lowermost record on vanes 36. When there is no record in magazine 35, the rotation of shut-down arm 53 is not interfered with, thus causing opening of the motor switches, and stopping of the system after the last record has played. Operating knobs 54, 55, 56 and 57 are mounted on motor-board 32 for selectively operating the phonograph, as will be explained hereinafter.

Figure 23:
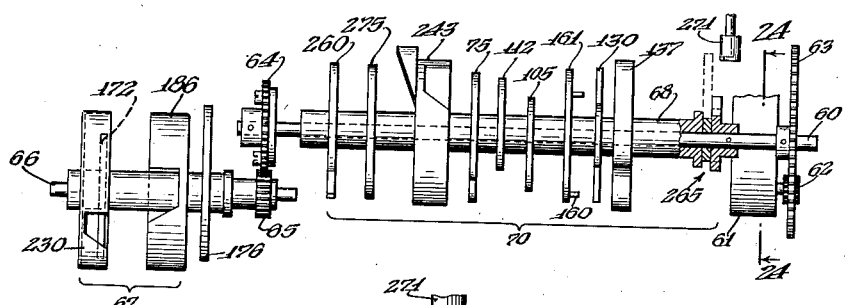
Figure 23 is an enlarged side view, similar to a part of Figure 2, showing details.

The various cams that operate the phonograph system are illustrated in elevation in Figures 2 and 23. Shaft 60 is driven by the record changing motor through reduction gearing indicated at 61. Pinion 62 is driven by the reduction gearing, and in turn drives gear 63 secured to shaft 60. The other end of shaft 60 is provided with a small gear 64 driving pinion 65 secured to stub shaft 66. A group of cams, generally indicated at 67, are secured to stub shaft 66. Cams 67 operate pick-up arm 30, feeler arm 51, and a master switch to be described hereinafter.

As long as the changer motor rotates, it will drive cams 67 through gears 62, 63 and 64, 65. Cam sleeve 69 embraces driving cam shaft 60 and may be coupled thereto by clutch 265. The cam group indicated at 70 is secured to cam sleeve 68. Cams 70 serve to control the movements of the parts associated with the record changing mechanism. The ratio of gears 62, 63 and 64, 65 is arranged so that cams 67 make two revolutions per cycle, while cam group 70 makes one revolution per cycle.

*Vane control mechanism*

The records are dropped one by one from magazine 35 to turntable 33, by swinging of the lowermost vane 36 clear of the edge of the record positioned thereon. Details of the control mechanism for the vanes 36 are shown particularly in Figs. 3 to 6 in conjunction with Fig. 1. The vane control mechanism is an improvement on the construction shown in U. S. Patent 2,188,769 to Downs.

The records R, which may be of mixed diameter, such as 10″ and 12″ records, are supported above the turntable by a series of vanes 36 situated at one side of the turntable. Vanes 36 engage the edges of the records and in conjunction with support arm 50 retain them above turntable 33. Support arm 50 is operated by one of the cams 70 shown in Figs. 3 and 23, in a manner to be described hereinafter. Vanes 36 and support arm 50 are operated in a manner to release the records one at a time onto movable elevators 47 and 48 at diametrically opposite sides of turntable 33. Elevators 47 and 48 then lower the released record onto the turntable.

Before the lowermost record is released, elevator 47 is moved upwards, lifting the series of records off support arm 50, which is then swung clear of the record edge. The lowermost record is then released by the lateral movement of the lowermost of the vanes 36 supporting such record, the record thus tilting and falling onto elevator 48 which has been moved up to receive it. As each record is released from its storage position, the remaining records are moved downwards a sufficient distance to bring the next vane, which becomes the lowest of the series, into position to be swung laterally for release of another record.

The lateral movement of each vane is effected by rotatable sleeve 74 which is rotated by cam 75. Vane cam 75 is secured to cam sleeve 68, being freely rotatable on driving shaft 60. Rotatable sleeve 74 embraces column 76 on which vanes 36 are mounted to be rotated individually and independently of each other. The downward movement of the series of vanes is effected by causing column 76 to move downwards step by step. Towards this end, column 76 is slidable vertically, and is retained in its upper position by engagement between the lowermost vane of the series and the upper portion of sleeve 74. When the lowermost vane is turned out of its supporting position, column 76 moved downwards until the next vane engages sleeve 74, and so on throughout the series.

Each vane 36 has a projection 77. Projection 77 on the lowermost vane rests on ledge 78, forming a portion of the cam surface 80 of sleeve 74. When sleeve 74 is rotated in a clockwise direction, projection 77 on the lowermost vane 36 presses against ledge 78 and is accordingly rotated until it assumes a position at right angles to its record supporting position. At the same time cam surface 80 on sleeve 74 supports the lowermost vane in its previous position. When sleeve 74 is swung back in a counter-clockwise direction, the lowermost vane slides along cam surface 80 until its projection 77 drops onto ledge 78. To counteract any shock or noise which may result when the lowermost vane falls onto ledge 78, the ledge may contain a suitable buffer (not shown) of resilient material.

There is provided means to prevent the vanes other than the lowest vane in the series from being moved out of alignment while the records are placed thereon. A vertical pillar 81 is placed adjacent the vanes. Pillar 81 has cut-away portions 82. Normally, the projections 77 on vanes 36 are in alignment with the teeth formed by the cut-away portions 82 vertical pillar 81. However, only projection 77 in the lowermost vane is free to rotate when sleeve 74 is rotated.

Sleeve 74 is automatically rotated by vane cam 75. For this purpose pinion 83, secured to the lower end of sleeve 74, meshes with rack 84 reciprocatably mounted at the end of lever 85. Lever 85 is pivoted intermediate its end at 86, its lower end having a biasing spring 87. Lever 85, integral with cam follower 88, is rotated in a counterclockwise direction when cam 75 rotates, against the action of biasing spring 87. Rotation of cam follower 88 in a counterclockwise direction causes a displacement of rack 84 to the left (Fig. 3) causing sleeve 74 to rotate in a clockwise direction. The effect is to rotate lowermost vane 36, 90° into its inoperative position. Rack 84 returns to its previous position under the influence of biasing spring 87, which in turn causes sleeve 74 to rotate counterclockwise and to bring the vane which is then the lowest one in engagement with ledge 78 of sleeve 74.

When all the records have been played, vanes 36 may be lifted by actuating knob 90. To return the vanes to their normal record retaining position, knob 90 is rotated causing the vanes to engage pillar 81. This insures correct alignment of all the vanes for loading. The lower end of column 76 has a ratchet wheel 91 secured thereon. Ratchet wheel 91 is engaged by pawl 92. Spring 93 presses pawl 92 against wheel 91. Pawl 92 is pivoted to plate 94. Plate 94 has a forked end 95 embracing a rod 96. When column 76 is moved downwardly due to the rotation of vanes 36, plate 94 is slid along rod 96 to prevent rotation thereof. Pawl 92 engaging ratchet wheel 91 prevents rotation of knob 90 in the clockwise direction.

*Record changing and reversing operation*

The mechanism for changing and reversing the records will now be described, particularly in connection with Figures 7 to 13. This mechanism embodies improvements over that of copending application, Serial No. 251,297, filed January 17, 1939, in the showing of the detailed structure of improved operative means for actuating the associated elements of said co-pending application, and of which this application is a continuation in part.

Record magazine 35 is shown in Figure 7 in readiness for dropping the lowermost record. A plurality of records R are stacked on vanes 36, being centered above turntable 33 by spindle 37. Record support arm 50 is swung clear of the edges of the records, and elevator 47 is raised to support the free edges of the records. Elevator 47 is connected with lever 100 by rod 101 slidably mounted in bearing 102. Lever 100 is pivoted at 103. The end portion 104 of lever 100 rides over cam 105, being secured to cam sleeve 68. The up-and-down movements of elevator 48 are controlled by lever 106. Lever 106 is slidably mounted in bearing 108 pivotally connected with rod 107. Lever 106 is pivoted at 110 and has a roller 111 which rides over cam 112. Elevator cam 112 is also fixed on cam sleeve 68.

Figure 9:
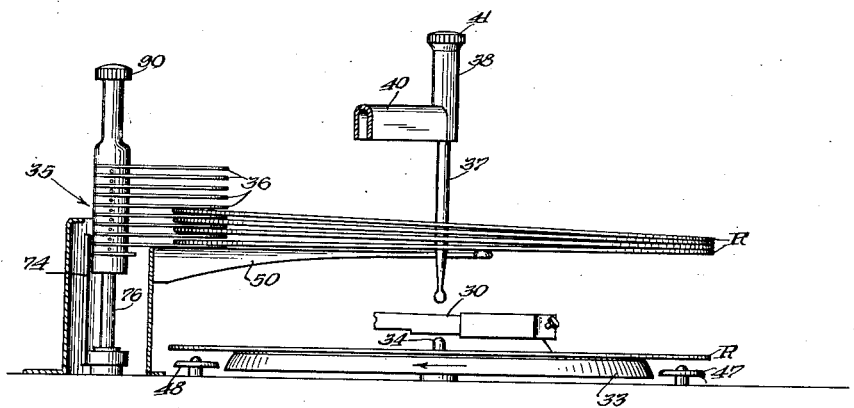
Figures 9, 10 and 11 are views similar to Figure 7 showing other positions of the record changing mechanism.

When elevator 47 has been lifted to the position as shown in Figure 7, the lowermost vane 36 swings clear of the edge of the record deposited thereon, as explained hereinabove. In the meantime elevator 48 has been lifted a predetermined distance. The lowermost record R drops onto elevator 48, as shown in Figure 8. In the position of Figure 8, the lowermost vane 36 has not been moved down, since sleeve 74 has not yet returned to its inoperative position. Record support arm 50 then swings back to its record supporting position, to support the remaining records, as shown in Figure 9. Elevators 47 and 48 are then lowered, by the action of cams 105 and 112, to their lowermost position, as shown in Figure 9. The dropped record is in position on turntable 33. Pick-up arm 30 is then automatically moved on the marginal edge of the record on turntable 33, as will be described.

Figure 12:
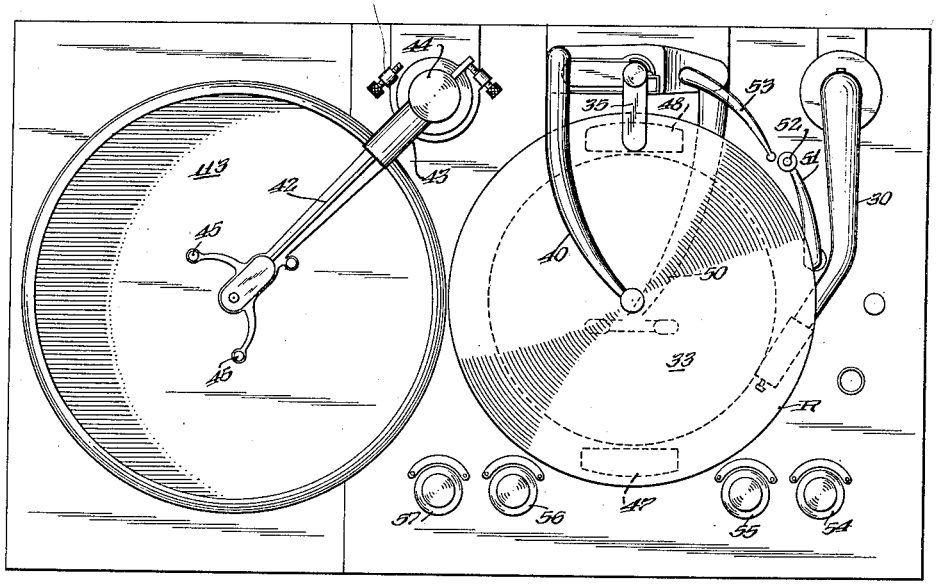
Figures 12 and 13 are top plan views respectively corresponding to Figures 9 and 10.

In the position shown in Figures 9 and 12, the mechanism is ready to play one side of the record on turntable 33. It will be observed that record support arm 50 is positioned below the records in the magazine. On the other hand, record reversing arm 42 is above receptacle 113 by which the played records are deposited.

Figure 10:
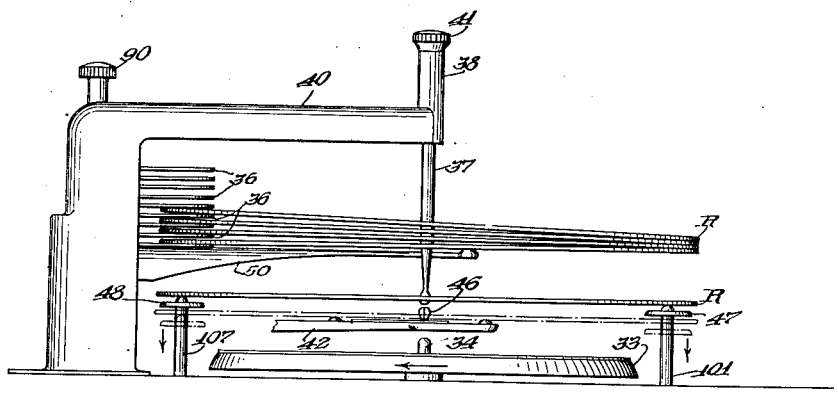
Figure 13:
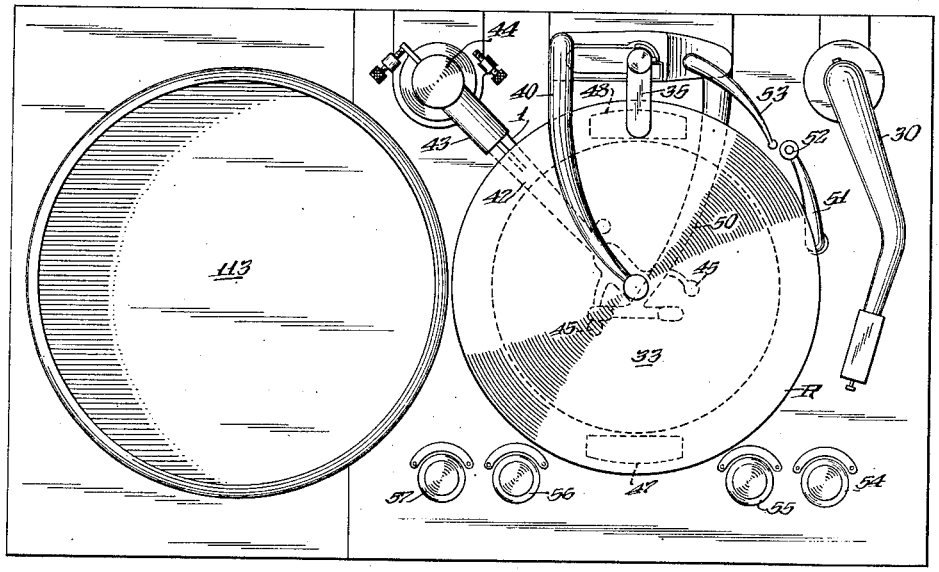

After the positioned record has been played, the record changing mechanism is automatically set in operation, as will be explained in detail hereinafter. Elevators 47 and 48 are lifted to the position shown in solid lines in Figure 10. Record reversing arm 42 is swung below the lifted record, as shown in Figures 10 and 13. Elevators 47 and 48 are then moved down, to deposit the record on record reversing arm 42. The gripping mechanism 46 of arm 42 engages the center of the record, as shown in dotted lines in Figure 10.

Figure 11:
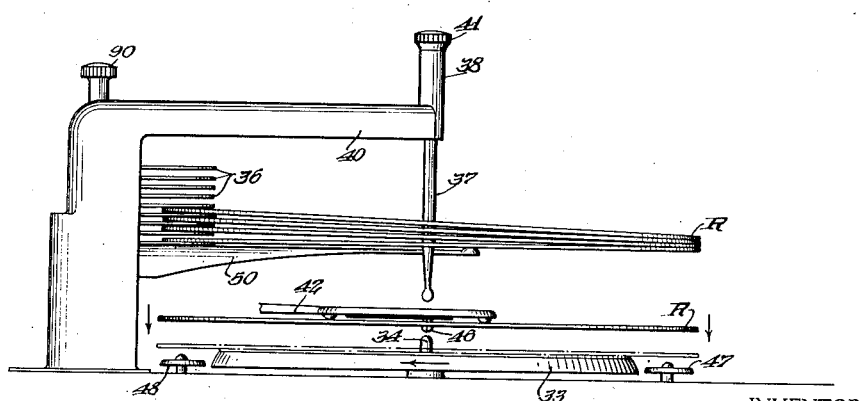

Record reversing arm 42 holding the record is then swung to a position above receptacle 113. Arm 42 is then turned about its axis by 180° so that the reverse side of the record will be placed in a position for playing. Record reversing arm 42 is returned to the position above turntable 33, as shown in Figure 11. The record is on the under side of arm 42. When gripping mechanism 46 is released, the record is dropped into proper playing position on turntable 33. Elevators 47 and 48 remain in their lowermost position.

Record reversing arm 42 remains above turntable 33 during the playing of the record. After playing of the record, elevators 47 and 48 are lifted to bring the record to a position just below the record reversing arm 42. The record is then gripped by mechanism 46. Arm 42 is thereupon swung above deceptacle 113 and actuated to release the record. At this stage, the mechanism is again in the position of Figure 7, when the next record is lowered onto turntable 33, to start the cycle.

*Operation of the record reversing arm*

Record reversing arm 42 is rotated 180° about its axis within spindle 43 for reversing the record it carries. Reference is now made to Figure 26. The rotation is imparted to arm 42 by rack 116 secured to the upper end of vertical pull-rod 117 meshing with pinion 115. Pinion 115 is secured to the end of arm 42. Rack 116 is reciprocated a sufficient distance by pull-rod 117, to completely turn over arm 42 by one movement of the rack, and back again in the opposite movement. The vertical movement of pull rod 117 is obtained through a further rack and pin. A rack 118 embraces sleeve 120, and is slidable thereon. Rack 118 meshes with pinion 121 secured to shaft 122. Rack 118 bears plate 123 on which pull-rod 117 is mounted. Spring 125 bears against a shoulder on pull-rod 117, and against plate 123.

The oscillating movement of a record reversing arm 42 is derived by a corresponding rotary movement of the casing 44 secured to sleeve 43. For this purpose casing 44 has a depending sleeve 120. A pinion 131 secured to sleeve 120 meshes with a rack 132. The reciprocatory movement of rack 132 is secured by crank lever 133 attached to shaft 134. Crank lever 135 is secured to shaft 134, and engages with cam groove 136 of cam 137. Cam 137 is also secured to cam sleeve 68 and rotates in unison with cam 130. Figure 27 is a detail cross-sectional view through cam 137. Crank lever 133 is not rigidly connected with rack 120, but is slidable thereon. The rocking movement of crank lever 133 is transmitted to rack 132 by springs 138 and 140, to insure a smooth oscillating movement by record reversing arm 42. It will now be evident that rotation of cam 137 rocks crank lever 135, which in turn rocks crank lever 133. Rack 132 is thus displaced to the left or to the right, which in turn causes a corresponding rotation of casing 44.

Each record is adapted to be gripped by grippers 45 which engage with the central hole of the records. Grippers 46 comprise two segmental portions 141, 142 shown in detail in Figure 28. Segmental portions 141, 142 are disposed centrally on the outer end of record reversing arm 42. and project therefrom. Segmental portions 141, 142 are movable towards and away from each other, effecting the contraction and expansion action of the grippers for the records. Segmental portions 141, 142 are mounted on record reversing arm 42 at 145. Spring 146 embraces levers 143, 144 tending to pull them together.

When tapered end 147 of sliding shaft 148 is displaced to the right, segmental portions 141, 142 are forced apart as seen in Figure 28. When sliding shaft 148 is moved to the left, spring 146 pulls segmental portions 141, 142 together for the record releasing position. The rear end of sliding shaft 148 has a head 150 which engages with bell crank lever 151. Bell crank 151 is operated the the upper end of a vertically slidable pull rod 152 which reciprocates within vertical sleeve 120. Slidable pull rod 152 is operated by crank 153 secured to one end of shaft 154. The other end of shaft 154 bears another crank 155 which is engaged by projection 156 on lever 157 pivoted intermediate its length at 158. The free end of lever 157 is engaged by projections 160 on cam 161 secured to cam sleeve 68.

When cam 161 rotates in unison with cams 130 and 131, its projections 160 rock lever 157 in a clockwise direction. The rocking movement of lever 157 causes rotation of shaft 154 in a counter-clockwise direction, which in turn lifts pull rod 152 through crank 153. When pull rod 152 moves upwards, it rocks bell crank lever 151, causing a movement of sliding shaft 148 towards the left. The movement of sliding shaft 148 in the opposite direction is obtained by a spring, not shown in the drawings.

*Pick-up arm control mechanism*

The mechanism for controlling pick-up arm 30 is shown particularly in Figures 20 and 21. The pick-up control mechanism operates to swing the pick-up arm to a position above the marginal groove of the record on turntable 33, and to then lower it onto the record. When the playing of the record is finished, the pick-up arm is lifted from the playing surface and swung clear of the record to its non-playing position. A selector is combined with the pick-up arm control mechanism so that records of different diameters may be played in any desired order. The selector operates to correctly position the pick-up arm in accordance with the size of the record to be played.

Pick-up arm 30 is mounted on the upper end of vertical sleeve 165. The pick-up arm is so mounted that it is capable of a swinging movement in a horizontal plane into and out of playing position, while remaining free to pivot about its rear end so that the forward end of pick-up arm 30 may be raised and lowered vertically from the record playing surface. The vertical movement of pick-up arm 30 is obtained by a vertical shaft 166 passing through sleeve 165. The upper end of shaft 166 is connected to the rear end of pick-up arm 30. Its lower end projects below motor board 32 where it is connected with plate 167. The vertical raising of pick-up arm 30 is secured by imparting a vertical downward movement to shaft 166. The pick-up arm is lowered onto the record playing surface by gravity, by permitting shaft 166 to move freely upwards after it has been previously depressed.

The downward movement of shaft 166 is obtained through pivoted rocking lever 168. One end of rocking lever 168 has a fork 170 which engages circular plate 167 secured to the lower end of shaft 166. Rocking lever 168 is oscillated about its pivot 171 by means of cam 172. Cam 172 is secured to stub shaft 66 mentioned previously. When the rear end of rocking lever 168 is lifted by cam 172, its forked end 170 is depressed and thereby moves plate 167 downwards. This causes the forward end of pick-up arm 30 to lift off the surface of the record.

Continued rotation of cam 172 releases the downward pressure of forked end 170 of rocking lever 168 from plate 167. This permits the outer end of pick-up arm 30 to move downwards and raise vertical shaft 166 to its upper position in readiness for the next downward movement. Fork 170 of rocking lever 168 is provided with friction pads 173 bearing against circular plate 167. Friction pads 173 hold circular plate 167 against any rotary movement of pick-up arm 30 in its raised position.

The rotary motion of sleeve 165 is obtained by imparting a turning movement to arm 174 secured to the lower end of sleeve 165. Arm 174 is turned in a clockwise direction when it is desired to swing pick-up arm 30 inwards or towards its playing position. Rotation of arm 174 in a counter-clockwise direction swings pick-up arm 30 inwards or away from its playing position.

The turning movements of arm 174 are obtained from lever 175 mounted substantially at right angles to arm 174. Lever 175 is operated from cam 176, shown particularly in Figures 2 and 23. Lever 175 has a projection 177 engaging pins 178 and 180 on arm 174. To turn arm 174 in a clockwise direction, lever 175 is moved to the right. During this movement of lever 175, its projection 177 engages pin 178 on arm 174, thereby causing the arm to turn. Movement of lever 175 in the opposite direction causes the other pin 180 to engage with projection 177, so that arm 174 rotates in a counterclockwise direction.

As it is essential that the pick-up arm be free to move across the playing surface of the record during playing, lever 175 is moved to a neutral position wherein arm 174 is free to move unobstructed between the positions predetermined by spaced pins 178 and 180. Arm 181 is also secured to the lower end of sleeve 165, and has a projecting pin 182 engaging with ring 183 pivoted at 184. Thus, when tone arm 30 is moved inwards during playing of a record, its rotary motion is transmitted to ring 183 for a purpose to be explained hereinafter.

*Tone arm positioning for different sized records*

The selector for correctly positioning the tone arm is controlled by feeler arm 51, shown particularly in Figures 14 to 19, and Figure 22. The feeler arm is mounted on the upper end of vertical spindle 185, which in turn is rotatably mounted in motor-board 32. Feeler arm 51 is at a height above motor-board 32 so as to be in alignment with the edge of a record in playing position on turntable 33. Feeler arm 51 normally rests clear of the record edge.

When a record has been placed on the turntable, spindle 185 is rotated to cause feeler arm 51 to move inwards towards the edge of a positioned record. The inward movement of feeler arm 51 is interrupted when it contacts with the record edge. Arm 51 remains at the edge until pick-up arm 30 is lowered onto the record playing surface. Feeler arm 51 is thereupon moved to its outward position by cam 186. Cam 186 is secured to stub shaft 66. During its rotation, cam 186 engages with the outer end of crank 187 attached to the lower end of vertical spindle 185 projecting below motor-board 32.

Figure 15:
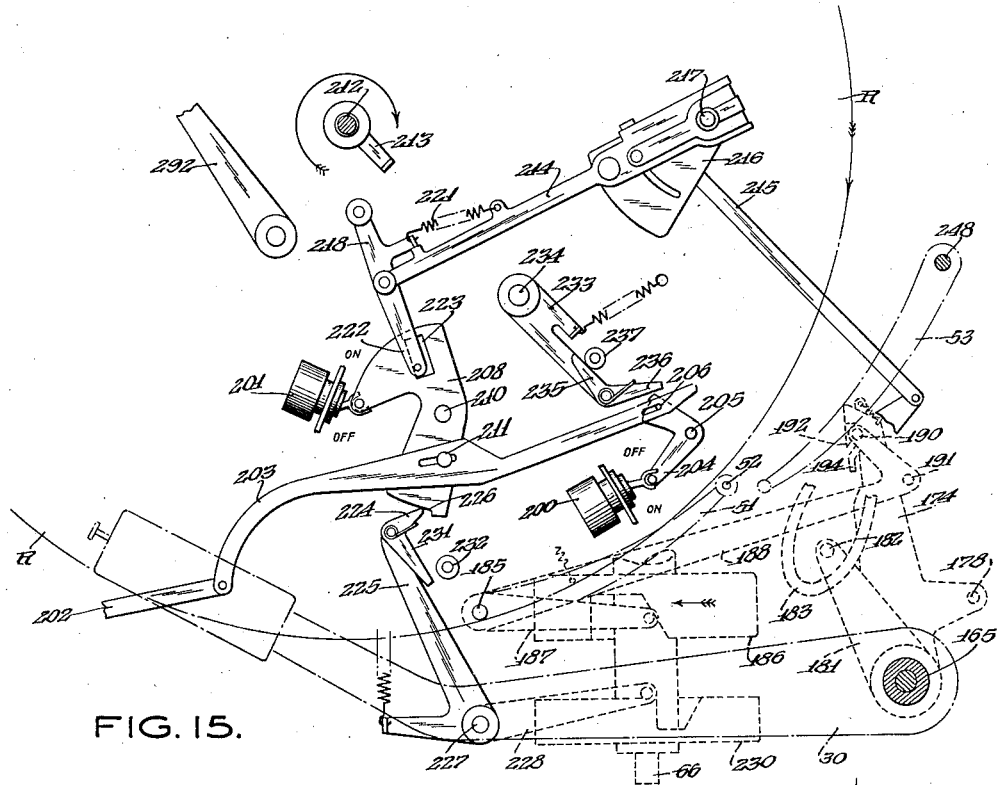
Figure 15 is a top plan view similar to Figure 14, with some parts broken away, showing the position of the mechanism when both the turntable and record changing mechanism start simultaneously.

The inward movement of pick-up arm 30 varies for records of different diameter. The varied inward movement of pick-up arm 30 is effected by an arm 188 secured to vertical spindle 185 with two pins 190 and 191. During the counter-clockwise rotation of arm 188 either pin 190 or 191 engages with stop 192 on arm 174, which has been moved into the path of movement of pins 190 or 191 by the rotation of vertical spindle 165, as shown in Figure 15. A stop 192 is provided on the outer end of arm 174. Since pins 190 and 191 are carried on the outer end of lever 188, they move upon rotation of vertical spindle 185.

Spindle 185 is rotated until feeler arm 51 fixed thereon engages with the edge of a positioned record. Either pin 190 or 191 will then be in the path of travel of stop 192. Pin 190 will be brought into engagement with stop 192 when a 12" record is positioned on turntable 33, pin 191 corresponding to a 10" record. When spindle 165 is rotated to move pick-up arm 30 inwards, arm 174 will also be rotated until its stop 192 engages with one of the pins 190 or 191, preventing further inward movement of the pick-up arm. When the pick-up arm has been lowered onto the record on turntable 33, cam 186 engages and turns crank 187, whereupon spindle 185 rotates in a clockwise direction. Feeler arm 51 is consequently moved away from the playing position. Accordingly, lever 188 is also turned in a clockwise direction, thereby effecting disengagement between either pin 190 or 191 on arm 188 and stop 192. Pick-up arm 30 is now free to move across the record surface in playing.

The position of the first sound groove near the marginal edge of a record varies on different records of even the same diameter. Pins 190 and 191 accordingly are so arranged that the normal inward movement of pick-up arm 30 terminates at a point where the needle of the pick-up is approximately midway between the edge of the record and the first playing groove on the plain marginal portion of the record. The final inward movement of the pick-up arm 30 to engage the sound track is effected as feeler arm 51 is moved to its outward position.

This final movement is imparted to pick-up arm 30 by pivotally mounted bias lever 193 controlled by spring 194, shown clearly in Figure 21. Bias lever 193 is mounted on the outer end of lever 174 and has an abutment 194 which projects upward from the lever. Abutment 194 is so arranged in relation to stop 192 that, as the stop moves out of engagement with pins 190 and 191 on arm 188, abutment 194 engages one of the pins 190 or 191. This causes lever 174 to turn in a clockwise direction until the needle of the pick-up reaches the first sound groove. Frictional resistance is thereupon set up by the engagement of the pick-up needle with the sound track groove, causing bias lever 193 to turn about its pivot in a clockwise direction against the action of spring 194. Continued movement of lever 188 causes abutment 194 to disengage from pin 190 or 191, and release pick-up arm 30. Pick-up arm 30 consequently is free to move to the end of the sound track on the record.

*Motor control switch mechanism*

In the phonograph of the invention two motors are employed, one driving the turntable and the other the record changing mechanism. The two motors, not shown in the drawings, are controlled by two independent switches, seen in Figures 14 to 19 and 22. Master switch 200 controls the stopping and starting of both motors. Switch 201 controls the motor driving the record changing mechanism. The on and off positions of switches 200 and 201 are indicated on the drawings. Master switch 200 is closed manually when it is desired to play a series of records. When master switch 200 is closed, or is in the "on" position, it connects both motors to the power supply. Master switch 200 remains closed throughout the playing of the entire series of records. Master switch 200 is then opened automatically by a shut-down device to be described hereinafter.

Switch 201 operating the motor driving the record changing mechanism is automatically closed at the finish of the playing of each side of a record, and is automatically opened at the completion of each record changing cycle. Switch 201 remains closed, or in its "on" position when master switch 200 is opened after the last record of the series has been played. Thus, the record changing cycle may be completed whereupon master switch 200 is once again closed preparatory to playing a new series of records.

Figure 22:
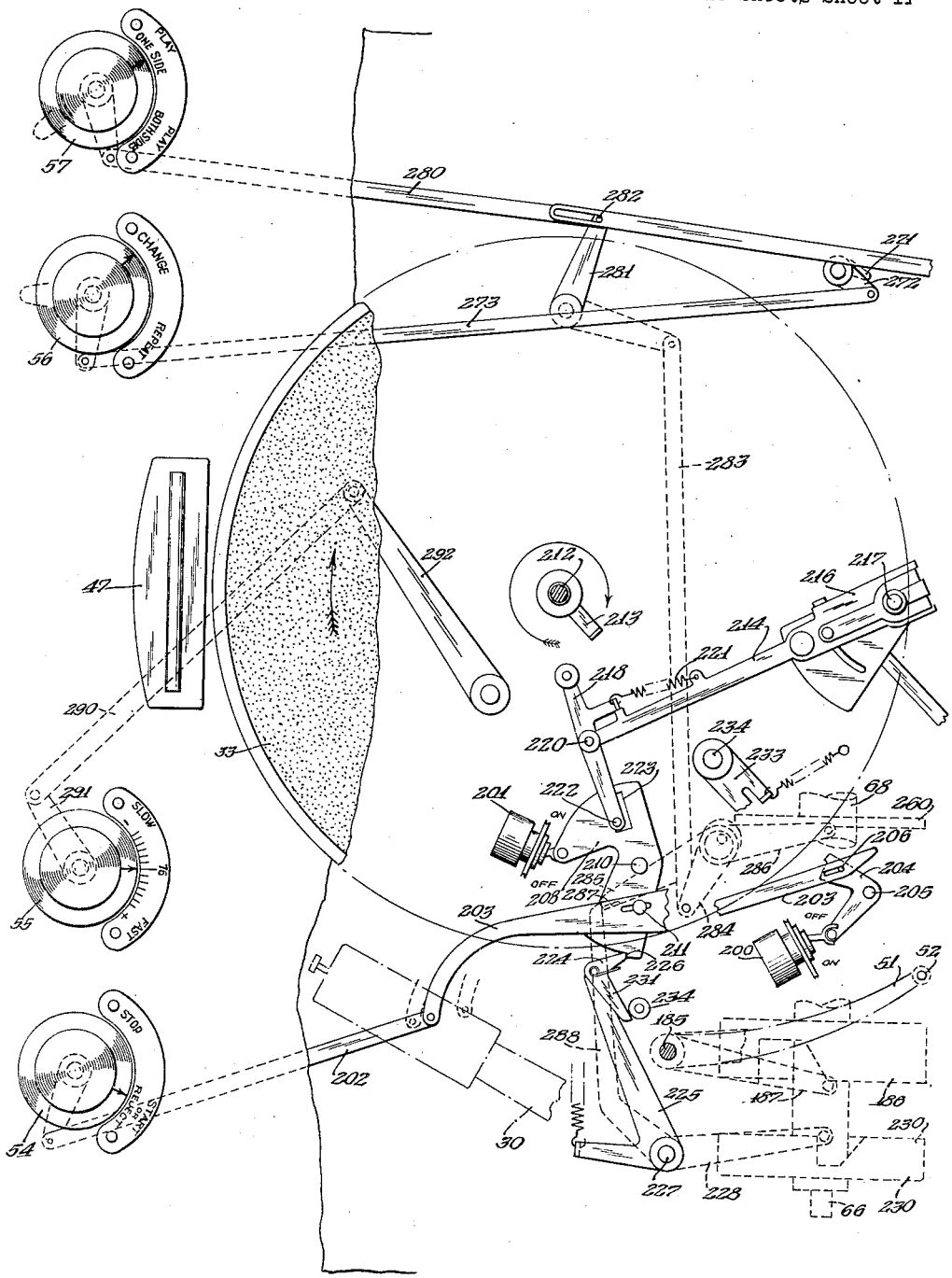
Figure 22 is a top plan view of the phonograph, with some parts broken away, showing the knobs for selectively controlling the various operations of the system.

Should master switch 200 be manually opened during the playing of a record, switch 201 would be in its open position. Means have been provided for manually closing switch 201. At the same time, master switch 200 is opened to operate the record changing mechanism. Such movement is derived by a crank 202 on the spindle knob 54, as seen in Figure 22. Crank 202 is connected to the operating button of both master switch 200 and switch 201 by lever 203. The button of master switch 200 is operated by bell crank lever 204, pivoted at 205. Connecting lever 203 is connected with bell crank lever 204 by a pin 206 thereof engaging slot 207 of connecting lever 203. The button of record changing mechanism switch 201 is operated by lever 208 pivoted intermediate its length at 210. Lever 208 is connected with lever 203 by a lost motion connection 211, similar to the lost motion connection 206, 207 on bell crank lever 204. The lost motion connection between connecting lever 203, bell crank 204 and lever 208, permits free automatic operation of switches 200 and 201.

Switches 200 and 201 are both manually operated through knob 54. Knob 54 has three positions, namely, "Stop," "Start," and "Reject," as indicated in Figure 22. As indicated above, switch 201, which controls the record changing mechanism, should be closed each time a record has been played to the end. This is automatically done through a modified trip switch mechanism. Towards this end, spindle 212 is provided with a striker 213. Striker 213 rotates in a clockwise direction with phonograph motor spindle 212.

Figure 16:
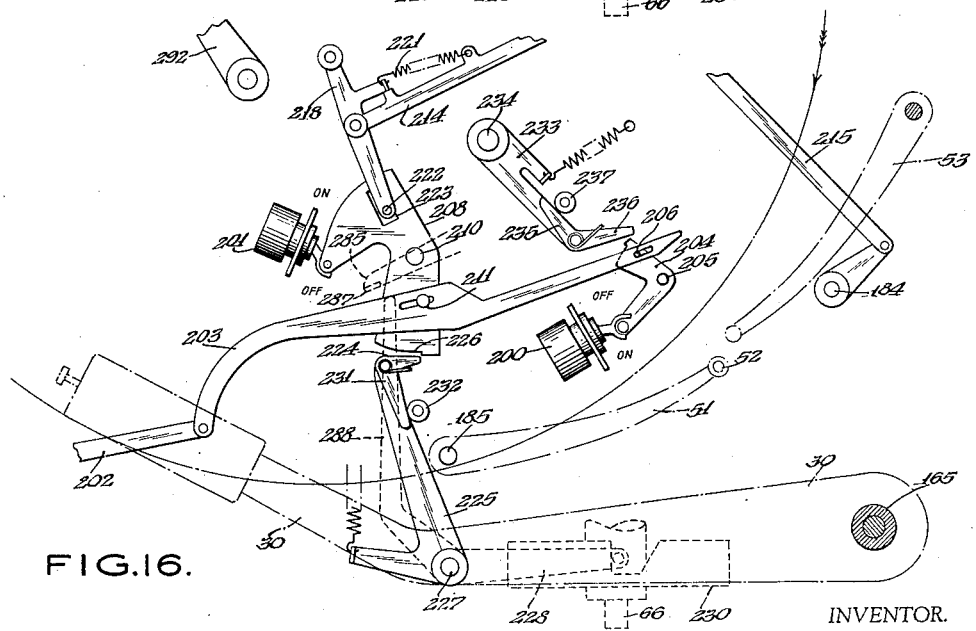
Figure 16 is a top plan view similar to Figure 14, showing the record changing mechanism at a stand-still and the starting of record playing.
Figure 17:
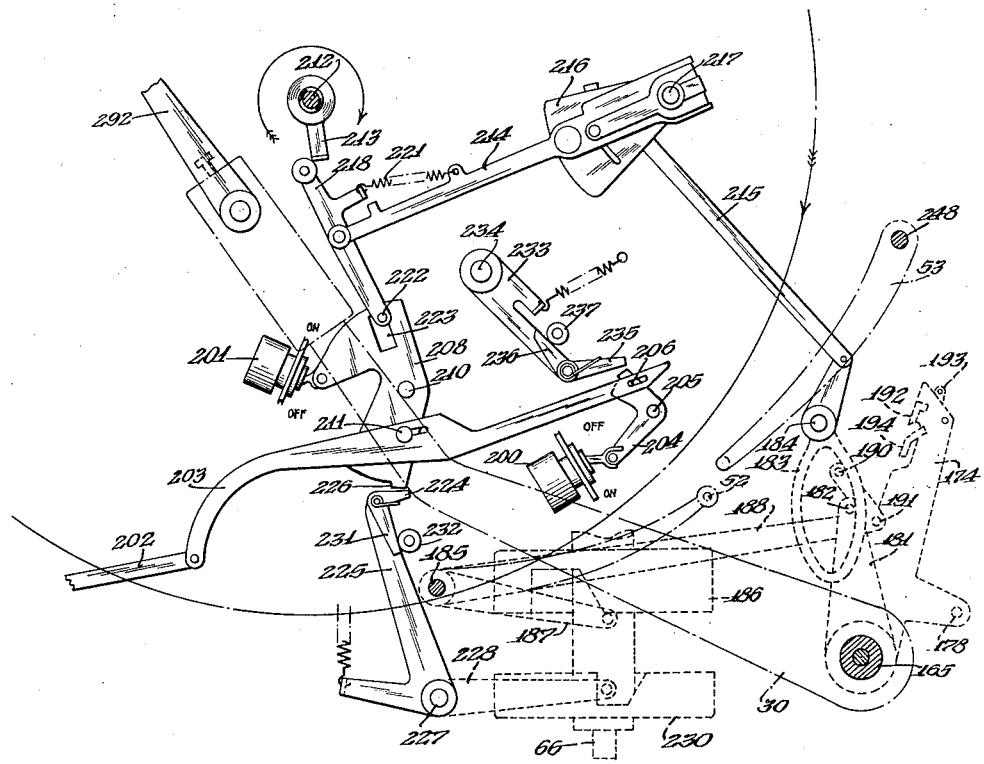
Figure 17 is a top plan view similar to Figure 14, wherein the tone arm has moved over a record and the record changing mechanism has been started automatically.
Figure 18:
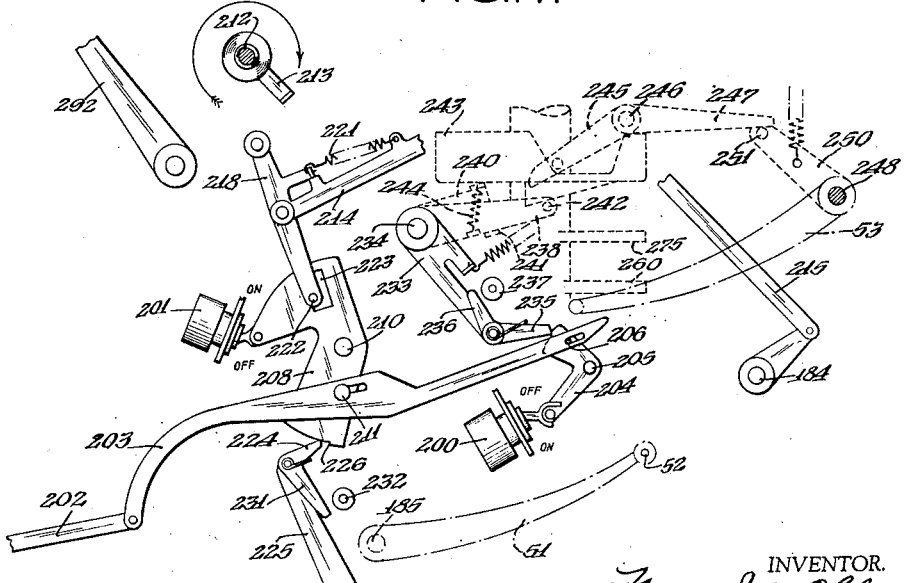
Figure 18 is a top plan view similar to Figure 14, illustrating the mechanism in the position after the last record has been played, and the shut-down control rendered operative to disconnect the system.

When tone arm 30 moves inwardly during the playing of a record, this clockwise movement is trasmitted to lever 214 in the following manner: Arm 181 moves together with tone arm 30, transmitting its movement to ring 183, which in turn is connected with lever 215. Lever 215 is connected with plate 216, pivoted at 217. Plate 216 carries lever 214 along by friction. Knock-off lever 218 is pivoted at 220, to the free end of lever 214. Biasing spring 221 tends to turn knock-off lever 218 in a clockwise direction. Hence when the needle of the pick-up moves over the record and finally runs into the usual run-off groove in the record, knock-off lever 218 is moved into the path of movement of striker 213, as shown in Figure 16. The end of knock-off lever 218, opposite striker 213, contains a pin 222 that engages cut-out 223 of lever 208.

The engagement of striker 213 with knock-off lever 218 causes the latter to rotate in a counter-clockwise direction, which in turn rotates lever 208 in a clockwise direction through pin 222 and slot 223. The clockwise rotation of lever 208 causes the button of switch 201 to move from the "off" to the "on" position, closing switch 201. The record changing mechanism motor is consequently connected to its power supply.

When the same, or another record is again in the playing position, switch 201 is automatically opened to disconnect the changing mechanism motor from its power supply, stopping the operation of the changing mechanism. This automatic operation is produced in the following manner: Pawl 224, pivoted to the end of lever 225, is adapted to engage a ledge 226 provided on the lowermost arm of lever 208. Lever 225 is rigidly connected to shaft 227. Arm 228 which rides over cam 230 is secured to shaft 227. Cam 230 is secured to stub shaft 66, and is so formed as to move lever 225 to the right until pawl 224, pivoted thereon, engages ledge 226 on lever 208, as shown in Figure 15. This causes lever 208 to be turned in a counter-clockwise direction and opens switch 201 to disconnect the motor power supply. This position is shown in Figure 16.

As long as pawl 224 engages ledge 226 of lever 208, the latter is not free to again close switch 201. Pawl 224 is accordingly withdrawn from engagement with ledge 226 when lever 225 reaches its extreme position. This is effected by causing the free end 231 of pawl 224 to engage fixed stop 232. The engagement causes pawl 224 to turn on its pivot and disconnect from ledge 226, as shown in Figure 16.

*Shut-down arrangement*

When all the records of a series have been played, and the last record has been removed from turntable 33 and dropped into storage receptacle 113, switches 200 and 201 are automatically opened, disconnecting both motors from the power supply. This position is shown particularly in Figure 18. To open master switch 200, lever 204 is turned on its pivot 205 by lever 233 rigidly attached to shaft 234. Lever 233 carries a pivoted pawl 235. Pawl 235 is arranged to engage with a projection at the end of lever 204, causing it to turn in a clockwise direction on pivot 205.

Pawl 235 is withdrawn from engagement with the projection on lever 204 when the overthrow movement of the switch button occurs at the end of the movement of lever 233, in order to leave master switch 200 free to be closed manually. This is effected simultaneously with the overthrow movement by causing pawl 235 to turn on its pivot and disengage with the coacting projection of lever 204. The action is substantially the same for both switches 200 and 201. The movement of lever 233 to bring its pawl 235 into engagement with lever 204 is derived from a further arm 238, seen in Figures 14 and 18. Arm 238 is mounted on shaft 234. When arm 238 is rotated, it causes a corresponding rotation of lever 233.

Crank 240 rigidly attached to shaft 234 produces the rotary movement in it. Crank 240 is turned in a clockwise direction by arm 238 freely mounted on shaft 234. Arm 238 engages abutment 241 of crank 240. Turning movement is imparted to arm 238 by cam follower 242 mounted on the free end of arm 238. Follower 242 is arranged to engage with cam 243. Normally cam follower 242 is held out of the path of movement of cam 243 by a light spring 244 mounted between crank 240 and arm 238. Simultaneously, spring 244 keeps arm 238 out of engagement with abutment 241 on crank 240.

A preliminary movement in a clockwise direction is imparted to arm 238 to bring its edge into engagement with abutment 241 on crank 240 and at the same time to bring cam follower 242 into the path of movement of cam 243. The preliminary movement is imparted by lever 245, shown also in Figure 25. Lever 245 is secured to shaft 246, the upper end of which carries a lever 247. Cam 243, secured to cam sleeve 68, rotates lever 245 in predetermined intervals in a counter-clockwise direction. During this rotation, the tip of lever 245 engages with cam follower 242 on arm 238, causing it to turn about shaft 234.

Operation of master switch 200 is prevented as long as a record is in position in the magazine by a shut-down arm 53. When shut-down arm 53 is rotated, it engages the edge of a record positioned in the magazine to interrupt the turning movement of lever 245 before its lower end engages cam follower 242. Shut-down arm 53 is rigidly connected with shaft 248 rotatably mounted in motorboard 32. Shut-down arm 53 projects sufficiently above the motor-board to be in alignment with the edge of the lowermost record in the magazine. Shut-down arm 53 normally rests clear of the record edge.

A crank 250 with a pin 251 is secured to the lower end of shaft 248. Pin 251 is engaged by lever 247 to effect its rotation. When lever 245 is rotated in a counter-clockwise direction, lever 247 is rotated in a similar direction, causing shut-down arm 53 to move inwardly towards the record in the magazine, through the action of crank 250. When there is a record in the magazine, the inward movement of shut-down arm 53 is interrupted, preventing full counter-clockwise rotation of lever 245. Master switch 200 is then not operated.

However, if no record is in the magazine, the inward movement of shut-down arm 53 is uninterrupted. Lever 245 is then consequently free to be rotated fully in its counter-clockwise direction. Thus, the tip of lever 245 engages with cam follower 242, which in turn causes cam 243 to rotate lever 238. Lever 238 then rotates lever 233, whereupon its pawl 235 engages with switch lever 204 to open master switch 200.

*Control for record support arm*

Figure 25:
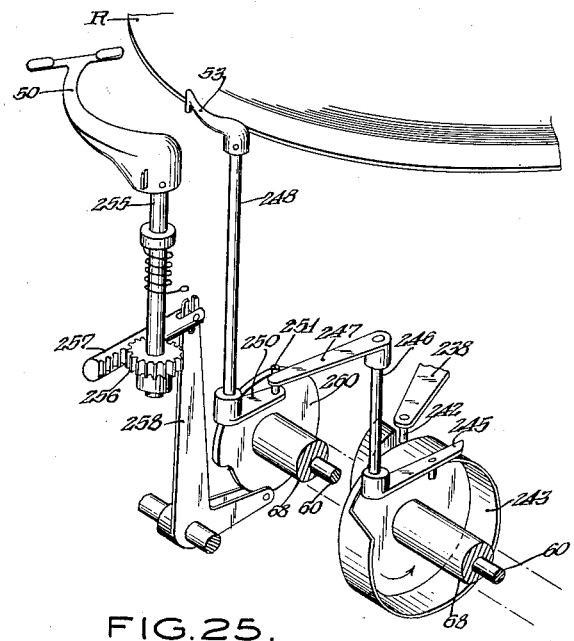
Figure 25 is a view in perspective of the shut-down arm and its associated operating mechanism.

Details of the system for swinging record supporting arm 50 below the records in magazine 35, clear of the edges of the records, is illustrated in Figure 25. Record supporting arm 50 is secured to shaft 255. Shaft 255 is rotatably supported in the motor-board. The lower end of shaft 250 carries pinion 256 which meshes with reciprocatably mounted rack 257. Rack 257 is pivoted to one arm of bell crank lever 258. The other arm of lever 258 rides over cam 260. Cam 260 is secured to cam sleeve 68. Rotation of cam 260 produces a rocking movement of bell crank lever 258, causing the displacement of rack 257. When rack 257 is displaced, it in turn swings record supporting arm 50 through the action on pinion 256.

*Record repeat arrangement*

The phonograph of the invention is arranged so that playing on one side of a record may be repeated any desired number of times. For this purpose, the record changing mechanism is rendered inoperative but the pick-up arm control remains operative. Towards this end, cam group 70 controlling the record changing mechanism is mounted as a unit on cam sleeve 68, explained hereinabove in connection with Figure 23. Cam group 67, for controlling the movement of the pick-up arm, is mounted separately on a stub shaft 66. Cams 67 and 70 are independently driven.

Figure 24:
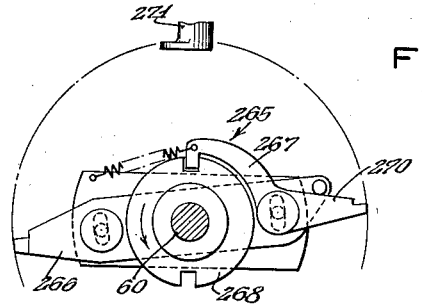
Figure 24 is a cross-sectional view taken on the line 24—24 of Figure 23, particularly showing the cam clutch.

Cam group 70 is connected with driving shaft 60 through manually operable clutch 265 seen in Figures 23 and 24. Clutch 265 may be operated to disconnect the driving of cams 70 when it is desired to repeat the playing of one side of a record. Cam sleeve 68 is mounted freely on drive shaft 60. The drive from shaft 60 to cam sleeve 68 is transmitted through the clutch generally indicated at 265. The driven portion of clutch 265 is formed integral with cam sleeve 68. Its driving portion 266 is slidably mounted on shaft 60. Driving clutch portion 266 is positively driven by shaft 60 through pawl 265 engaging notched disc 268 secured to driving shaft 60.

Clutch 265 is freed by causing free end 270 of pawl 267 to rotate in a clockwise direction to disengage pawl 267 from notched disc 268. When it is desired to free the clutch, a stop 271 is moved into the path of arm 270. Stop 271 is carried by one end of lever 272, as shown in Figure 22. Lever 272 is connected with the sleeve on operating knob 56 by lever 273. When operating knob 56 is in the position of Figure 22, stop 271 is moved into the path of arm 270, disengaging clutch 265. To assist in the freeing of clutch 265 a suitable overthrow device is provided on sleeve 68, operated by cam 275 in a manner not shown in the drawings. Cam 275 serves to give a final turning movement to record changing cam group 70, insuring complete disengagement of clutch 265.

*Control for playing one or both sides of a record*

Figure 14:
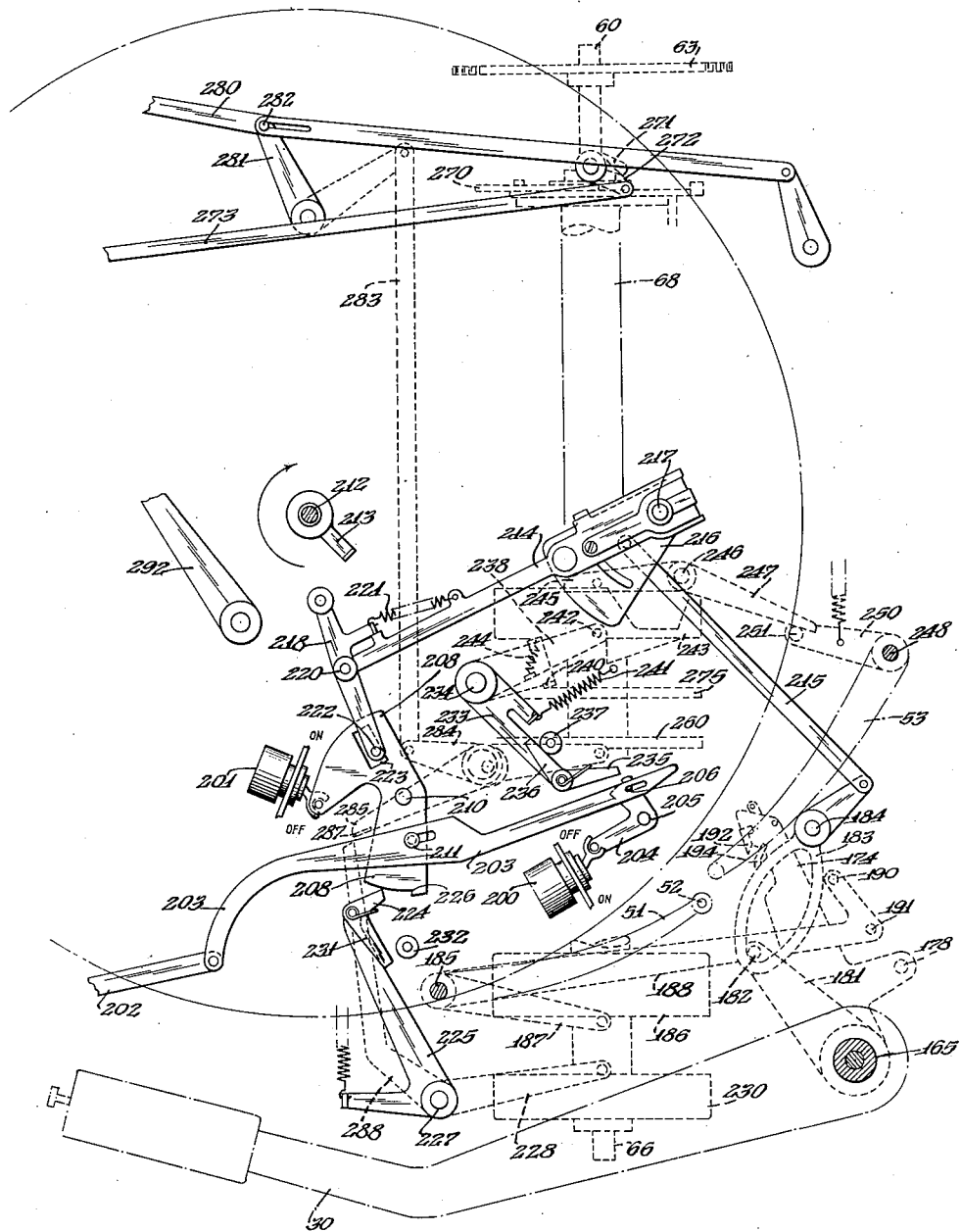
Figure 14 is a top plan view of the phonograph mechanisms as seen with the turntable and motorboard removed, the mechanism being in the stationary position.

Knob 57 determines whether one or both sides of a positioned record is to be played. The mechanism to effect the control is shown in Figures 14, 19 and 22. The sleeve of knob 57 is connected with reciprocatably mounted lever 280. Lever 280 is connected with bell crank lever 281 by pin-and-slot connection 282. Bell crank lever 281 is connected with lever 283, which in turn is secured to crank 284. Arm 285 rotates with crank 284. Cam follower 286 rides over cam 260. Arm 285 has an upstanding projection 287 adapted to cooperate with arm 288 secured to shaft 227.

When operating knob 57 is set for the playing of only one side of a record, lever 285 is in the position shown in Figure 19. Lever 285, when in such position, cannot interfere with the rotation of arm 288. Switch 201 will thus be disconnected in the manner described above due to the action of cam 230. However, when operating knob 57 is set for the playing of both sides of the record, arm 285 is moved towards arm 288 on shaft 227, as shown in Figure 22. Arm 285 in such position interferes with the clockwise rotation of arm 288. Pawl 224 on lever 225 accordingly cannot engage with ledge 226 of lever 208. Consequently, switch 201 will not be disconnected and the full record reversing cycle will take place.

Knob 55, shown in Figure 22, is used to adjust the speed of the turntable motor. Knob 55 is connected with lever 290 by crank 291. The movements of lever 290 are transferred to lever 292, which in turn controls the speed of the turntable motor.

Although I have described in detail a preferred embodiment for carrying out the various functions and operations of the invention, it is to be understood that modifications therein, falling within the broader spirit and scope thereof, may be practiced by those skilled in the art, and accordingly, I do not intend to be limited except as set forth in the following claims.

I claim:

1. Mechanism for supporting and delivering a stack of disc records from above to a turntable of a phonograph comprising: a series of laterally displaceable vanes mounted above the turntable for individually supporting one edge of each of a plurality of records comprising a stack, a laterally swingable arm mounted adjacent the turntable for normally supporting the record stack in association with said vanes, and an elevator mounted adjacent the turntable for periodically and in alternation with said arm supporting the record stack in association with the vanes; means operatively associated with said elevator for moving the same to lift the record stack and support the stack above said arm, and while the stack is supported by said elevator, means operatively associated with the arm for laterally swinging the same outwardly of said record stack and means operatively associated with the vanes for laterally displacing the lowermost vane away from the edge of the lowermost record of the stack whereby said lowermost record is released for tilting towards the turntable; the aforesaid means being sequentially actuable.

2. Mechanism for supporting and delivering a stack of disc records from above to a turntable of a phonograph comprising: a series of laterally displaceable vanes mounted above the turntable for individually supporting one edge of each of a plurality of records comprising the stack, a laterally swingable arm mounted adjacent the turntable for normally supporting the record stack from beneath in association with said vanes, and an elevator mounted adjacent the turntable for periodically and in alternation with said arm supporting the record stack in association with the vanes; means operatively associated with said elevator for moving the same to lift the record stack and support the stack above said arm, means operatively associated with the arm for laterally swinging the same outwardly from beneath said record stack while the stack is supported by said elevator, and means operatively associated with the vanes for laterally displacing the lowermost vane away from the edge of the lowermost record of the stack whereby said lowermost record is released for tilting towards the turntable; the aforesaid means being sequentially actuable.

3. Mechanism for supporting and delivering a stack of disc records from above to a turntable of a phonograph comprising: a series of aligned laterally displaceable vanes mounted above the turntable for individually supporting one edge of each of a plurality of records comprising the stack, a laterally swingable arm mounted adjacent the turntable for normally supporting the record stack from beneath in association with said vanes, and a vertically movable elevator mounted adjacent the turntable for periodically and in alternation with said arm supporting the record stack in association with the vanes; means operatively associated with said elevator for upwardly moving the same to lift the record stack and support the stack above said arm, means operatively associated with the arm for laterally swinging the same outwardly from beneath said record stack while the stack is supported by said elevator, and means operatively associated with the vanes for laterally displacing the lowermost vane away from the edge of the lowermost record of the stack whereby said lowermost record is released for tilting towards the turntable; the aforesaid means being sequentially actuable.

4. Mechanism for supporting and delivering a stack of disc records from above to a turntable of a phonograph comprising: a series of laterally displaceable vertically aligned vanes mounted above the turntable for individually supporting one edge of each of a plurality of records comprising the stack, a laterally swingable arm mounted adjacent the turntable for normally supporting the record stack from beneath in association with said vanes, and a vertically movable elevator mounted adjacent the turntable for periodically and in alternation with said swinging arm supporting the record stack in association with the vanes at an edge diametrically opposite to the vane supporting edge; means operatively associated with said elevator for upwardly moving the same to lift the record stack and support the stack above said arm, and while the stack is supported by said elevator, means operatively associated with the arm for laterally swinging the same outwardly from beneath said record stack and means operatively associated with the vanes for laterally outwardly displacing the lowermost vane from the edge of the lowermost record of the stack, whereby the lowermost record is released for downward tilting about the elevator supported edge of the record stack towards the turntable.

5. Mechanism for supporting and delivering a stack of disc records from above to a turntable of a phonograph comprising: a series of laterally displaceable vertically aligned vanes mounted above the turntable for individually supporting one edge of each of a plurality of records comprising the stack, a laterally swingable arm mounted adjacent the turntable for normally supporting the record stack from beneath in association with said vanes, and a vertically movable elevator mounted adjacent the turntable for periodically and in alternation with said swinging arm supporting the record stack in association with the vanes at an edge diametrically opposite to the vane supporting edge; means operatively associated with said elevator for upwardly moving the same to lift the record stack and support the stack above said arm, means operatively associated with the arm for laterally swinging the same outwardly from beneath said record stack while the stack is supported by said elevator, and means operatively associated with the vanes for laterally outwardly displacing the lowermost vane from the edge of the lowermost record of the stack whereby the lowermost record is released for downward tilting about the elevator supported edge of the record stack towards the turntable; the aforesaid means being sequentially actuable.

6. Mechanism for supporting and delivering a stack of disc records from above to a turntable of a phonograph comprising: a series of laterally displaceable vanes mounted above the turntable for individually supporting one edge of a plurality of records comprising the stack, a laterally swingable arm mounted adjacent the turntable for normally supporting the record stack in association with said vanes, and a movable elevator mounted adjacent the turntable for periodically and in alternation with said swinging arm supporting the record stack in association with the vanes; means operatively associated with said elevator for moving the same to lift the record stack and support the stack above said arm, means operatively associated with the arm for laterally swinging the same outwardly from beneath said record stack while the stack is supported by said elevator, and means operatively associated with the vanes for laterally displacing the lowermost vane from the edge of the lowermost record of the stack whereby the lowermost record is released for tilting toward the turntable, means operatively associated with said arm for returning the same beneath the record stack, and means operatively associated with said elevator for lowering the same whereby the record stack support is returned to the remaining vanes and arm, and the tilted record released towards the turntable; the aforesaid means being sequentially operable.

7. Mechanism for supporting and delivering a stack of disc records from above to a turntable of a phonograph comprising: a series of laterally displaceable vanes mounted above the turntable for individually supporting one edge of each of the plurality of records comprising the stack, a laterally swingable arm mounted adjacent the turntable for periodically supporting the record stack in association with said vanes, and a movable elevator mounted adjacent the turntable for periodically and in alternation with said swinging arm supporting the record stack in association with the vanes; means operatively associated with said elevator for moving the same to lift the record stack and support the same above said arm, means operatively associated with the arm for laterally swinging the same outwardly from beneath said record stack while the latter is supported by said elevator, and means operatively associated with the vanes for laterally displacing the lowermost vane from the edge of the lowermost record of the stack whereby the lowermost record is released for tilting towards the turntable, said arm swinging and elevator moving means in their operation serving to thereafter respectively return the arm into record stack supporting position and the elevator out of record supporting position, whereby the tilted record is released towards the turntable; the aforesaid means being sequentially actuable.

8. Mechanism for supporting and delivering a stack of disc records from above to a turntable of a phonograph comprising: a series of laterally displaceable vanes mounted above the turntable for individually supporting one edge of each of a plurality of records comprising the stack, a laterally swingable arm mounted adjacent the turntable for periodically supporting the record stack in association with said vanes, and an elevator mounted adjacent the turntable for periodically and in alternation with said arm supporting the record stack in association with the vanes, a second elevator mounted adjacent the turntable and distant from the first elevator; means operatively associated with said first elevator for upwardly moving the same to lift the record stack and support the stack above the arm, means operatively associated with the arm for laterally swinging the same outwardly from beneath said record stack while the stack is supported by said first elevator, and means operatively associated with the vanes for laterally displacing the lowermost vane away from the edge of the lowermost record of the stack whereby said lowermost record is released for tilting towards the turntable, means operatively associated with said second elevator for upwardly moving the same to receive the tilted edge of the lowermost record, means operatively associated with said arm for returning the same beneath the record stack, and means operatively associated with said first elevator for lowering the same to permit the record stack to be supported on the arm in association with the vanes and allow the tilted record to be released for movement towards the turntable, said first named elevator serving as it is lowered to support an edge of the released record, thereby to deliver the record towards the turntable in association with the second elevator.

9. Mechanism for supporting disc records above and delivering them in succession to a turntable comprising: a vane assembly above the turntable incorporating a series of vertically spaced laterally displaceable vanes each of which supports a record at its peripheral edge, a laterally swingable arm distant from the vane assembly and mounted adjacent the turntable to support the records in juxtaposition from underneath, whereby records thus supported by the vane and arm form a substantially inclined record stack, vertically reciprocable elevators disposed at opposite sides of the turntable and below the peripheral edge of the records; and a series of means actuable in sequence and operatively connected respectively with said vane assembly said swinging arm and the elevators, to raise the one of the elevators to lift the record stack at an edge distant from said vane assembly whereby the record stack is displaced above and free of support by said arm, to swing said arm laterally from under the record stack, to raise the other of the elevators to a level lower than that of the one elevator, to swing the lowermost vane of said vane assembly away from the edge of the lowermost record of the stack whereby said lowermost record being supported only at an edge by the one elevator is released for tilting downwardly about said supported edge as a pivot until a distant edge thereof rests upon said other elevator, to return the arm to its position under the record stack and above the tilted lowermost record, to lower said one elevator whereby the record stack drops upon said arm and said released tilted record is supported on both elevators.

10. Mechanism for supporting disc records above and delivering them in succession to a turntable comprising: a vane assembly above the turntable incorporating a series of vertically spaced laterally displaceable vanes each of which supports a record at its peripheral edge, a laterally swingable arm distant from the vane assembly and mounted adjacent the turntable to support the records in juxtaposition from underneath, whereby records thus supported by the vane and arm form a substantially inclined record stack, vertically reciprocable elevators disposed at opposite sides of the turntable and below the peripheral edge of the records; and a series of means actuable in sequence and operatively connected respectively with said vane assembly said swinging arm and the elevators, to raise the one of the elevators to lift the record stack at an edge distant from said vane assembly whereby the record stack is displaced above and free of support by said arm, to swing said arm laterally from under the record stack, to raise the other of the elevators to a level lower than that of the one elevator, to swing the lowermost vane of said vane assembly away from the edge of the lowermost record of the stack whereby said lowermost record being supported only at an edge by the one elevator is released for tilting downwardly about said supported edge as a pivot until a distant edge thereof rests upon said other elevator, to vertically lower said vane assembly by a distance equal to the spacing between successive vanes, to return the arm to its position under the record stack and above the tilted lowermost record, to lower said one elevator whereby the record stack drops upon said arm and said released tilted record is supported on both elevators, and to lower both of said elevators to deliver the released record onto the turntable.

11. Mechanism for supporting and delivering stacked disc records in succession from above to a turntable of a phonograph comprising: a series of spaced laterally displaceable vanes mounted above the turntable for individually supporting one edge of each of a plurality of records comprising the stack, a laterally swingable arm mounted adjacent the turntable and distant from the vanes for normally supporting the record stack above the turntable in association with said vanes, a vertically movable elevator mounted adjacent the turntable for lifting the record stack from said arm and for periodically supporting the record stack in association with said vanes, a second vertically movable elevator mounted adjacent the turntable and distant from the first elevator to receive an edge of the lowermost record of the stack when said record is released from its vane and arm support; a series of means operatively associated respectively with the elevators, arm and vanes and sequentially actuable, for raising the first elevator to lift the record stack above the arm and to support the stack in association with the vanes, for swinging said arm outwardly from the record stack, for laterally displacing the lowermost record supporting vane away from the edge of said record to permit the same to tilt towards and contact at an edge with the second mentioned elevator, for returning the said arm beneath the remaining vane supported record stack, for lowering said first mentioned elevator whereby the record stack support is returned to the arm and the vanes whereby to release the tilted lowermost record from the record stack, for further lowering said first elevator to the same level as the second elevator whereby the released lowermost record is supported by the respective elevators at a horizontal level, and for subsequently lowering both of said elevators carrying the released record until the same is deposited onto the turntable.

12. Mechanism for supporting and delivering stacked disc records in succession from above to a turntable of a phonograph comprising: a series of spaced laterally displaceable vanes mounted above the turntable for individually supporting one edge of each of a plurality of records comprising the stack, a laterally swingable arm mounted adjacent the turntable for normally supporting the record stack above the turntable in association with said vanes, a vertically movable elevator mounted adjacent the turntable for lifting the record stack from said arm and for periodically supporting the record stack in association with said vanes, a second vertically movable elevator mounted adjacent the turntable and distant from the first elevator to receive an edge of the lowermost record of the stack when said record is released from its vane and arm support; a series of means operatively associated respectively with the elevators, arm and vanes and sequentially actuable, for raising the first elevator to lift the record stack above the arm and to support the stack in association with the vanes, for swinging said arm outwardly from beneath the record stack, for laterally displacing the lowermost record supporting vane away from the edge of said record to permit the same to tilt towards and contact at an edge with the second mentioned elevator, for returning the said arm beneath the remaining vane supported record stack, for lowering said first mentioned elevator to permit the record stack to be supported on the arm and the vanes whereby to allow the release of the tilted lowermost record from the record stack for movement towards the turntable, for further lowering said first elevator to the same level as the second elevator whereby the released lowermost record is supported by the respective elevators at a horizontal level, and for subsequently lowering both of said elevators carrying the released record until the same is deposited onto the turntable, and for lowering said series of vanes upon release of the lowermost record of the stack by an amount equal to the spacing between said vanes to bring the succeeding lowermost supported record into position for subsequent release.

13. Mechanism for supporting and delivering stacked disc records in succession from above to a turntable of a phonograph comprising: a series of spaced laterally displaceable vanes mounted above the turntable for individually supporting one edge of each of a plurality of records comprising the stack, a laterally swingable arm mounted adjacent the turntable for normally supporting the record stack above the turntable in association with said vanes, a guide rod mounted to pass through a central opening of the records for insuring central delivery of each record onto the turntable, a vertically movable elevator mounted adjacent the turntable for lifting the record stack from said arm and for periodically supporting the record stack in association with said vanes, a second vertically movable elevator mounted adjacent the turntable and distant from the first elevator to receive an edge of the lowermost record of the stack when said record is released from its vane and arm support; a series of means operatively associated respectively with the elevators, arm and vanes and sequentially actuable, for raising the first elevator to lift the record stack above the arm and to support the stack in association with the vanes, for swinging said arm outwardly from beneath the record stack, for laterally displacing the lowermost record supporting vane away from the edge of said record to permit the same to tilt towards and contact at an edge with the second mentioned elevator, for returning the said arm beneath the remaining vane supported record stack, for lowering said first mentioned elevator to permit the record stack to be supported on the arm and the vanes whereby to allow the release of the tilted lowermost record from the record stack for movement towards the turntable, for further lowering said first elevator to the same level as the second elevator whereby the released lowermost record is supported by the respective elevators at a horizontal record, and for subsequently lowering both of said elevators carrying the released record until the same is deposited onto the turntable.

14. Mechanism for supporting and delivering a stack of disc records to a turntable of a phonograph comprising: a series of spaced vertically aligned and laterally displaceable vanes mounted adjacent the turntable for individually supporting one edge of a plurality of records forming a stack, a laterally swingable arm mounted adjacent the turntable for movement thereabove, and periodically supporting the records of the stack in cooperation with the vanes, a vertically movable elevator mounted adjacent the turntable and diametrically opposite the vanes for periodically supporting the opposite edge of the stack, said vanes, arm and elevator being capable of operation in sequence, wherein the elevator is moved upwardly to lift the stack from the arm and assume support of the records in conjunction with the vanes; the arm thereby freed from supporting the stack of records is swung outwardly away from the stack of records, while the same is supported in lifted position by the elevator and vanes; the lowermost record supporting vane is laterally displaced permitting the lowermost record to tilt downwardly; and the arm is swung back to supporting position between the dropped record and the lowermost record of the stack to form with the vanes a support for the stack.

15. Mechanism for supporting and delivering a stack of disc records to a turntable of a phonograph comprising: a series of spaced vertically aligned and laterally displaceable vanes mounted adjacent the turntable for individually supporting one edge of a plurality of records forming a stack, a laterally swingable arm mounted adjacent the turntable for movement thereabove, and periodically supporting the records of the stack in cooperation with the vanes, a vertically movable elevator mounted adjacent the turntable and diametrically opposite the vanes for periodically supporting the opposite edge of the stack, and a second vertically movable elevator mounted adjacent the turntable and diametrically opposite the first elevator for supporting the edge of a record; said vanes, arm and elevators being capable of operation in sequence, wherein the first elevator is moved upwardly to lift the stack from the arm and assume support of the records in conjunction with the vanes; the arm thereby freed from supporting the stack of records is swung outwardly away from the stack of records while the same is supported in lifted position by the first elevator; the lowermost record supporting vane is laterally displaced permitting the lowermost record to tilt downwardly whereby the edge of the tilted record rests on the second elevator; the arm swung back to supporting position between the dropped record and the lowermost record of the stack to form with the vanes a support for the stack, and the two elevators carrying the lowermost tilted record drop with the record towards the turntable.

16. Mechanism for supporting and delivering a stack of disc records to a turntable of a phonograph comprising a plurality of vertically aligned spaced vanes mounted adjacent the turntable providing a vane support for a plurality of records forming the stack at the edge of each record, a laterally swingable arm mounted adjacent the turntable for movement thereabove and supporting the records of the stack in cooperation with the vanes supports the records thereof, a vertically movable elevator mounted adjacent the turntable and diametrically opposite the vanes for supporting the edge of the stack opposite to those of the record supported by the vanes, said vanes, arm and elevator, being capable of operation in sequence wherein the elevator is moved upwardly to lift the stack from the arm and assume support of the records in conjunction with the vanes, the arm freed from supporting the stack of records is swung outwardly away from the stack of records, the lowermost record vane support is laterally displaced, permitting the lowermost record to tilt downwardly, and the arm swung back to supporting position between the tilted record and the lowermost record of the stack to form a support for the stack in association with the undisplaced vanes supporting the respective records of the stack.

17. Mechanism for supporting and delivering a stack of disc records from above to a turntable of a phonograph comprising: a member positioned above the turntable for supporting at their edges and in spaced relationship a plurality of records comprising the stack, a movable element mounted adjacent the turntable for normally supporting the record stack in association with said member and a second movable element mounted adjacent the turntable for periodically supporting the record stack laterally of and in association with the member; means operatively associated with said second element for moving the same into stack supporting position, means operatively associated with said first element for moving the same from stack supporting position while the stack is supported by said second element and the member, and means operatively associated with the member for withdrawing support thereby from the edge of the lowermost record of the stack, whereby said lowermost record is released for tilting towards the turntable; the aforesaid means being sequentially actuable.

18. Mechanism for supporting and delivering a stack of disc records from above to a turntable of a phonograph comprising: spaced elements positioned above the turntable for individually supporting one edge of a plurality of records comprising the stack, a movable member mounted adjacent the turntable for normally supporting the record stack in association with said spaced elements, and a second movable member mounted adjacent the turntable for periodically supporting the record stack at an edge laterally of and in association with the spaced elements; means operatively associated with said second movable member for moving the same into stack supporting position, means operatively associated with the first movable member for moving the same from stack supporting position while the stack is supported by said second movable member and the spaced elements, and means operatively associated with the spaced elements for displacing the lowermost thereof away from the edge of the lowermost record of the stack, whereby said lowermost record is released for tilting towards the turntable; the aforesaid means being sequentially actuable.

19. Mechanism for supporting and delivering a stack of disc records from above to a turntable of a phonograph comprising: spaced elements positioned above the turntable for individually supporting one edge of each of a plurality of records comprising the stack, a swingable arm mounted adjacent the turntable for normally supporting the record stack in association with said spaced elements, and an elevator mounted adjacent the turntable for periodically supporting the record stack in association with the spaced elements; means operatively associated with said elevator for moving the same into stack supporting position, means operatively associated with the arm for swinging the arm outwardly of said record stack while the stack is supported by said elevator and spaced elements and means operatively associated with the spaced elements for displacing the lowermost thereof away from the edge of the lowermost record of the stack, whereby said lowermost record is released for tilting towards the turntable; the aforesaid means being sequentially actuable.

FRANCIS JOHN OFFEN.